Dec. 19, 1961   J. BOYCE   3,013,595
APPARATUS FOR PROCESSING FRUIT
Filed Dec. 8, 1958   2 Sheets-Sheet 1
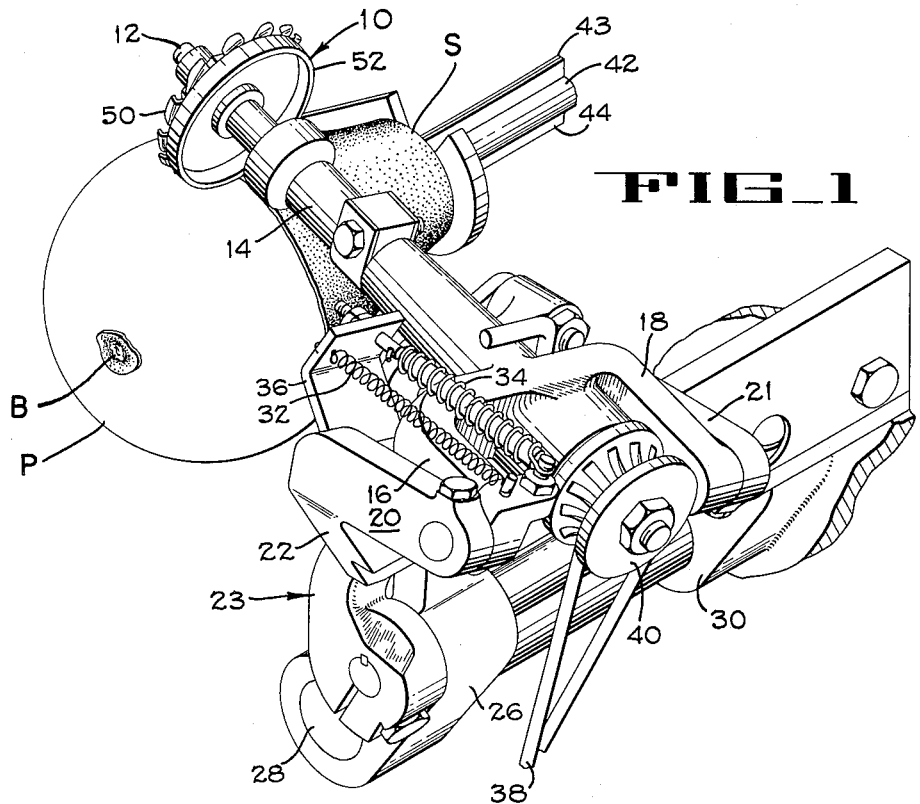
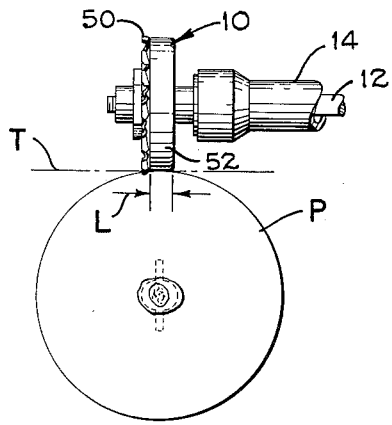
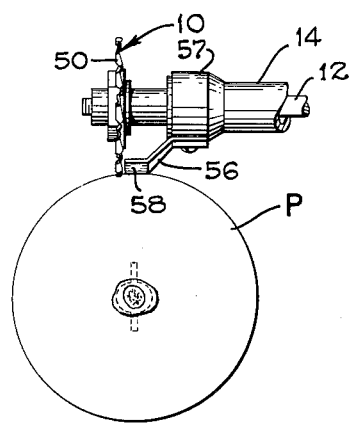
INVENTOR
JOHN BOYCE
BY *Hans G. Hoffmeister*
ATTORNEY Dec. 19, 1961 J. BOYCE 3,013,595
APPARATUS FOR PROCESSING FRUIT
Filed Dec. 8, 1958 2 Sheets-Sheet 2
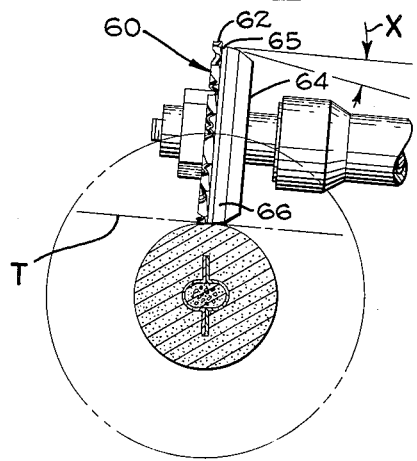
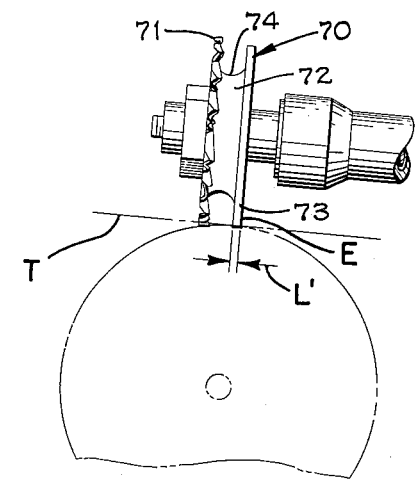
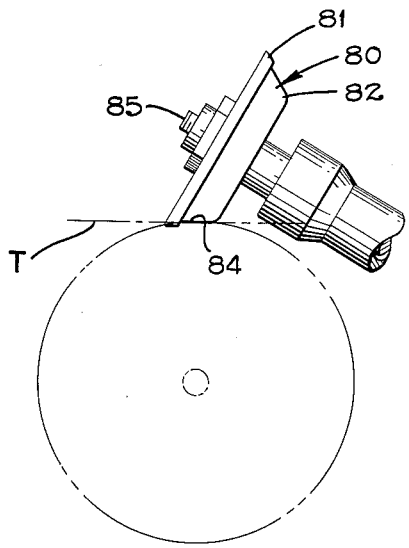
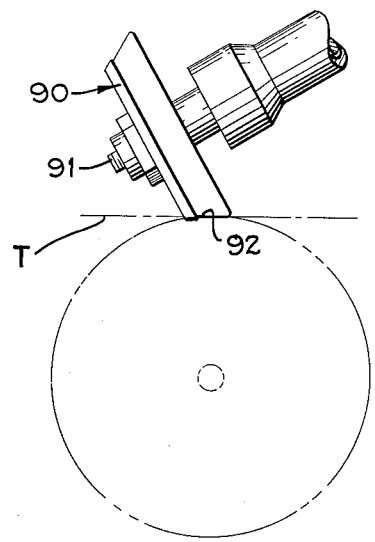
INVENTOR
JOHN BOYCE
BY *Hans G. Hoffmeister*
ATTORNEY

United States Patent Office 3,013,595
Patented Dec. 19, 1961

3,013,595
APPARATUS FOR PROCESSING FRUIT
John Boyce, San Jose, Calif., assignor to FMC Corporation, a corporation of Delaware
Filed Dec. 8, 1958, Ser. No. 778,839
5 Claims. (Cl. 146—43)

This invention pertains to apparatus for processing fruit, and more particularly relates to a rotary cutter for peeling pears.

This application is an improvement of the cutter structure of the general type shown in copending application of John Boyce, Serial No. 526,532 filed August 4, 1955, now Patent 2,891,591.

Rotary cutters have previously been used in pear peeling machines of the type in which the pear is rotated about its stem-blossom axis, while the cutter, which is moved longitudinally from one end of the pear to the other, is rotated about an axis normal to the axis of the pear. The cutter is resiliently urged inwardly toward the axis of the pear and is held in cutting contact with the surface of the pear as it moves along the pear. To control the depth of the peeling cut, a gauge is usually provided on the leading side of the cutter.

Such rotary cutters have been generally unsatisfactory for peeling pears since some of these cutters tend to dig into the surface of soft pears, thereby producing an erratic peeling action in which the depth of cut varies over a wide range. Other proposed rotary cutters cannot adapt themselves to changes in the contour of the surface of the pear with the result that the cutter skips portions of the surface, leaving unpeeled areas from which the peel must be removed manually.

It is therefore an object of the present invention to provide an improved rotary cutter for peeling fruit.

Another object is to provide means for preventing a rotary peeling cutter from digging into the surface of the fruit being peeled.

Another object is to provide an improved gauge for a rotary peeling cutter.

Other and further features and objects of the present invention will become apparent from the following description taken in connection with the accompanying drawings, in which:

FIG. 1 is a fragmentary perspective showing the rotary cutter of the present invention mounted on a movable support mechanism and disposed in peeling contact with a pear that is mounted on a rotatable impaling tube.

FIG. 2 is a side elevation of the rotary cutter of the present invention, said cutter being shown mounted on a support member and disposed in contact with the surface of a pear being peeled.

FIGS. 3, 4, 5, 6 and 7 are diagrammatic side elevations of other embodiments of the rotary cutter of the present invention.

In FIG. 1 a cutter assembly 10 is shown rotatably mounted on a shaft 12 which is journalled for rotation in a tubular support arm 14. The arm 14 is provided at one end with a pair of spaced arms 16 and 18 which are pivotally mounted in arms 20 and 21, respectively, of a yoke 22 that is part of a cutter actuating and control mechanism 23 disclosed and claimed in the copending application of Creed et al., United States Serial No. 715,805, said application having been filed on February 17, 1958, which became Patent No. 2,984,274 on May 16, 1961, and assigned to the assignee of the present application.

In general, the actuating mechanism 23 comprises a bracket 26 which has a flange (not shown) on which the yoke 22 is pivotally mounted. The bracket 26 is secured to a rod 28 that is mounted for sliding movement in a fixed bracket 30. When the rod 28 is slid toward the right (FIG. 1) into the bracket 30, the cutter is moved from a position adjacent the blossom end B of a pear P to the stem end S. During its movement along the pear, the cutter assembly is held in contact with the surface of the pear by two springs 32 and 34 which are connected between the arm 16 of the cutter support tube and a bracket 36 secured to the yoke 22. The cutter is rotated, as it moves along the pear, by means of a power driven belt 38 that is trained around a pulley 40 keyed to the cutter shaft 12. The pear P is held on a rotatable support member which is in the form of an impaling member 42 that has drive fins 43 and 44. The drive mechanism for controlling the driving belt 38, the cutter actuating and control mechanism 23, and the impaling tube 42 is fully described in the above mentioned application Serial No. 715,805.

The cutter assembly 10 is particularly shown in FIG. 2 and comprise a cutting blade 50 which has a plurality of cutting teeth formed on its periphery. A gauge 52 is mounted on the drive shaft on the leading side of the cutting blade so, that, as the pear is rotated counterclockwise (FIG. 2), the gauge will contact the surface of the pear first and guide it into engagement with the blade.

It is to be noted that the gauge 52 has a pear-contacting surface disposed in a plane T which is tangent to a circle concentric with the impaling tube 42. It has been found that, if this surface does not have sufficient length, measured in the plane T, the spring loaded cutting blade will dig into the surface of the pear. On the other hand, if the gauge has a support surface in plane T that extends to a point too far away from the face of the cutting blade, the cutter will be prevented from maintaining contact with the surface of the pear when relatively steep portions of the surface of the pear are encountered. It has been discovered that, in order to prevent the spring loaded cutter from indenting or digging into the surface of a pear, the fruit-contacting support surface of the gauge must has an axial length L of not less than $\frac{3}{64}$ of an inch measured in plane T, which passes through the area of contact of the gauge and the pear and is tangent to a circle concentric with the impaling tube 42.

To prevent skipping of the cutter, the edge of the gauge support surface farthest from the cutting blade must not be more than $\frac{1}{4}$ of an inch from the cutting blade measured in plane T.

While the gauge 52 is illustrated as being a cylindrical member that is mounted on shaft 12 independently of the blade 50, it will be understood that the gauge could be formed as an integral part of the blade 50. Also, it is evident that the gauge 52 need not rotate and, accordingly, it can be mounted for free rotation about the axis of the shaft so that it may or may not rotate during the peeling operation. Further, as seen in FIG. 3, a gauge may be provided that is stationary and comprises a mounting arm 56 secured to a fixed bearing housing 57, and a gauging portion 58. The gauging portion 58 is illustrated as being formed as a part of a cylinder. Since this gauge is stationary, the gauging surface that contacts the fruit has exactly the same configuration as the portion of a fully cylindrical rotating gauge.

While a truly cylindrical surface provides satisfactory peeling, it has been found that satisfactory peeling may also be obtained if the gauging surface is inclined as much as 25 degrees inwardly toward the axis of the cutter from the tangent plate T defined by the area of contact between the gauging surface and the surface of the fruit. While such an inclined surface is frusto-conical, it provides adequate support and acts in the same manner as a truly cylindrical surface. Accordingly, the term cylindroidal will be used hereinafter in the specification and in the claims to indicate a surface, provided on either a stationary or a rotating gauge, that is like a cylindrical surface in configuration and function, and it is to be understood that this term particularly includes surfaces that are inclined as much as 25 degrees relative to the above defined tangent plane T.

In FIG. 4 another embodiment of the cutter assembly of the present invention is shown. This cutter 60 comprises a rotary blade 62 and a gauge 64 on the leading side of the blade. The gauge has a composite fruit-contacting surface made up of a generally cylindrical portion 65 and a frusto-conical portion 66. The portion 65 may have a length, measured in the above-mentioned plane T, of approximately 1/32 of an inch. The frusto-conical portion may have a length, measured in a direction parallel to the axis of the cutter, of approximately 1/16 of an inch and may slant inwardly toward the axis at an angle X which may be as great as 25 degrees. Thus, it is evident that the pear contacting surface need not be cylindrical but may slant inwardly while providing an adequate fruit-contacting surface having a total axial length in plane T of not less than 3/64 of an inch and having the edge of the surface farthest from the cutting blade not further than 1/4 of an inch from the blade.

In FIG. 5 another embodiment of the cutter assembly is illustrated. This cutter 70 comprises a cutting blade 71 and a gauge 72 which has a generally cylindrical fruit contact portion 73 and a reduced diameter portion 74 which spaces the portion 73 from the blade 71. In this embodiment, the length L' of the portion 73 in plane T is 3/64 of an inch or greater, and the edge E is not farther than 1/4 inch from the blade 71.

In FIG. 6 the cutter assembly 80 comprises a cutting blade 81 and a gauge 82. While the gauge 82 has a frusto-conical fruit-contacting surface 84, it will be noted that, due to the angle of inclination of the axis of the cutter drive shaft 85, the fruit-contacting surface is actually in the tangent plane T defined by the area of contact between the gauge and the fruit. Similarly, a cutter assembly 90 (FIG. 7), which is mounted on an inclined drive shaft 91 has a frusto-conical fruit contacting surface 92 that is also disposed in tangent plane T.

In all the cutter assemblies disclosed in FIGS. 2, 3, 4, 5, 6 and 7, the fruit-contacting surface has an axial length of not less than 3/64 of an inch measured in the tangent plane T, and the edge on said contact surface that is farthest away from the associated cutting blade is not farther than 1/4 of an inch from the blade measured in said plane T.

From the foregoing description it will be apparent that the present invention provides a cutter assembly which overcomes all of the difficulties experienced with previous rotary peeling cutters. Accordingly, a cutter assembly constructed within the limits defined by the present invention is capable of peeling pears in a more efficient manner than has heretofore been possible.

While the peeler of the present invention has been described and illustrated in connection with the peeling of pears, it is of course capable of peeling other fruit such as apples.

Having thus described my invention, what I claim as new and desire to protect by Letters Patent is:

1. A cutter assembly for use in peeling a pear and similar fruit, comprising a rotatable shaft, a single circular cutting blade secured to said shaft and having a peripheral cutting edge, and a gauge disposed to the leading side of said cutting blade, said gauge having a gauging surface having an axial length of not less than 3/64 of an inch, the edge of said gauging surface that is farthest from said cutting blade being spaced from said blade by not more than 1/4 of an inch.

2. A cutter assembly for use in peeling a pear and similar fruit, comprising a rotatable shaft, a single circular cutting blade secured to said shaft and having a plurality of spaced peripheral cutting teeth, and a gauge disposed on said shaft to the leading side of said cutting blade, said guage having a composite gauging surface formed by a cylindrical portion adjacent said cutting blade and a frusto-conical portion adjacent said cylindrical portion, said composite gauging surface having an axial length of not less than 3/64 of an inch, the edge of said composite surface that is farthest from said cutting blade being spaced from said blade by not more than 1/4 of an inch.

3. A cutter assembly for use in peeling a pear or the like, comprising a rotatable shaft, a single circular disc-like cutting blade secured to said shaft and having peripheral cutting teeth, and a gauge disposed on said shaft to the leading side of said cutting blade, said gauge having a cylindrical gauging surface axially spaced from said cutting blade and having an axial length of not less than 3/64 of an inch, the edge of said gauging surface that is farthest from said cutting blade being spaced from said blade by not more than 1/4 of an inch, said teeth being radially outwardly extended from said gauging surface by a distance sufficient to cut only chips of peel from the pear during rotation of the blade.

4. A cutter assembly for use in peeling a pear, comprising a rotatable shaft, a circular cutting blade secured to said shaft and having a plurality of peripheral teeth for chipping segments of peel from the pear, and a gauge disposed on said shaft to the leading side of said cutting blade, said gauge having a frusto-conical gauging surface having an axial length of not less than 3/64 of an inch, the edge of said gauging surface that is farthest from said cutting blade being spaced from said blade by not more than 1/4 of an inch.

5. A cutter assembly for use in peeling a fruit, such as a pear and the like, comprising a rotatable shaft, a circular cutting blade secured to said shaft and having peripheral cutting teeth for removing peeling from the fruit in chips, and a stationary gauge positioned to the leading side of said cutting blade, said gauge having a fragmentary cylindrical gauging surface axially spaced from said cutting blade and having an axial length of not less than 3/64 of an inch, the edge of said gauging surface that is farthest from said cutting blade being spaced from said blade by not more than 1/4 of an inch.

References Cited in the file of this patent

UNITED STATES PATENTS

| | | |
|---|---|---|
| 453,759 | Cottrell | June 9, 1891 |
| 652,181 | Haff | June 19, 1900 |
| 1,626,361 | Schmitt | Apr. 26, 1927 |
| 1,667,502 | Weiss | Apr. 24, 1928 |
| 1,699,995 | Shields | Jan. 22, 1929 |
| 1,726,722 | Sleeper | Sept. 3, 1929 |
| 1,836,320 | Goranson et al. | Dec. 15, 1931 |
| 1,872,731 | Goranson et al. | Aug. 23, 1932 |
| 2,620,002 | Lupton | Dec. 2, 1952 |
| 2,632,242 | Musso | Mar. 24, 1953 |